United States Patent Office 3,361,757
Patented Jan. 2, 1968

3,361,757
PROCESS FOR THE PREPARATION OF TETRAKIS-(DIHYDROCARBYLAMINO)ETHYLENES
Hilmer E. Winberg, Wilmington, Del., assignor to E. I. du Pont de Nemours and Company, Wilmington, Del., a corporation of Delaware
No Drawing. Filed Nov. 15, 1965, Ser. No. 507,692
6 Claims. (Cl. 260—309.7)

This invention relates to a new process for the preparation of tetrakis(dihydrocarbylamino)ethylenes.

The tetrakis(dihydrocarbylamino)ethylenes are old compounds disclosed in my copending U.S. application, Ser. No. 174,404, filed Feb. 20, 1962, now U.S. Patent 3,239,519. A generically applicable method for the preparation of the tetrakis(dihydrocarbylamino)ethylenes is described in this copending application. A further preparative route to the tetrakis(dihydrocarbylamino)ethylenes is disclosed in another of my copending applications, Ser. No. 258,172, filed Feb. 13, 1963, now U.S. Patent 3,239,534.

I have now discovered a method for preparing these tetrakis(dihydrocarbylamino)ethylenes which is a simple process involving readily available commercial intermediates of relatively low cost. This new synthesis can be described by the following schematic stoichiometry:

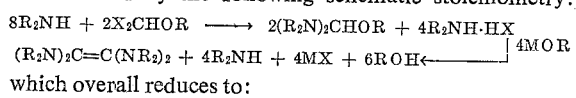
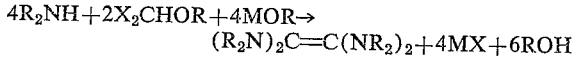

which overall reduces to:

$4R_2NH + 2X_2CHOR + 4MOR \rightarrow$
$(R_2N)_2C=C(NR_2)_2 + 4MX + 6ROH$ in which M is used to represent an alkali or alkaline earth metal of atomic number from 3–56, inclusive, and preferably an alkali metal or alkaline earth metal of atomic number from 3–20, inclusive, and most preferably an alkali metal of atomic number from 3–19, inclusive; the X's represent halogens of atomic number from 9–53, inclusive, and preferably are of atomic number from 9–35, inclusive, i.e., F, Cl, and Br, and the R's, which can be alike or different, represent in the case of the dihalomethyl ethers and the metal hydrocarbyl oxides, monovalent hydrocarbon radicals free of aliphatic unsaturation and of no more than 12 carbons each, such as alkyl, cycloalkyl, aryl, aralkyl, and alkaryl radicals and in the case of the substituents on the necessary secondary amine radical not only have the just-described significance but also can be together joined to form with the amine nitrogen of said secondary amine a heterocyclic structure of from 3–7 ring members, including not only solely carbon divalent radicals, but also oxa- and aza-interrupted such diradicals in which permutation the stoichiometry could perhaps more easily be presented as

wherein Q is as just defined, i.e., representative of divalent but aliphatically saturated hydrocarbon and oxa- or aza-interrupted hydrocarbon radicals of no more than 2–6 members and of a total of no more than 12 carbons.

The foregoing describes the operative amine moieties for use in the present process. In addition, the process is equally applicable to similar disecondary diamines, perhaps most easily described by the formula

wherein the R's are monovalent radicals as previously defined and $n$ is an integer from 2 to usually no more than 4, inclusive. Suitable specific examples of such hydrocarbyl and/or oxa- and/or aza-interrupted hydrocarbylamines in addition to those given in detail in the following examples are didodecylamine, di-n-octylamine, dicyclohexylamine, N-benzylaniline, diphenylamine, dibenzylamine, morpholine, piperidine, N-methylpiperazine, N,N'-diethylpropylenediamine, and the like.

Suitable specific examples of the hydrocarbyl dihalo-substituted methyl ethers include dichloromethyl ethyl ether, chlorofluoromethyl cyclohexyl ether, dibromomethyl phenyl ether, bromochloromethyl cyclohexyl ether, dichloromethyl dodecyl ether, chlorofluoromethyl n-octyl ether, and the like.

Suitable further examples of the metal hydrocarbyl oxide necessary as the third reactant include sodium ethoxide, potassium t-butoxide, potassium dodecyl oxide, sodium cyclohexyl oxide, calcium benzyl oxide, magnesium di-n-octyl oxide, rubidium butoxide, beryllium tolyl oxide, and the like.

To effect the improved synthesis of the present invention, the process is normally carried out by first reacting the dihalomethyl hydrocarbyloxy ether with an excess of the secondary amine sufficient to displace the halogens of the dihalomethyl hydrocarbyloxy ether and neutralize the hydrogen halide formed concurrently. With the strongly basic amines, this step is exothermic and hence some means of modulating the reaction heat generated is desirable, i.e., by either or both the use of a reaction medium and/or external reactor cooling. Alternatively, depending on the relative reactivity, external heat can be supplied. In any event, the reaction will normally not be carried out outside the range of from room temperature to possibly as high as 200–225° C., with the preferred normal range being from 25 to 100° C.

In the next stage of the process, the metal hydrocarbyl oxide, e.g., an alkali metal alkoxide, is added to the reaction mixture as obtained above from the secondary amine and the dihalomethyl hydrocarbyloxy ether. This normally results only in a mildly exothermic reaction resulting from neutralization of the secondary amine hydrohalide formed in the first step and liberation of the secondary amine and hydrocarbyl hydroxy compound, e.g., alcohol. As in the case of the first reaction step, reaction temperature will lie in the range from room temperature to as high as 200–225° C., with the preferred normal range being from 25–100° C.

A solvent or, more properly, a reaction medium is not necessary but may be, and conveniently is, employed since it moderates the initial normally exothermic reaction. Furthermore, the use of a reaction medium, depending on the reagents involved, can frequently and preferably serve as a simple means of removing the hydrocarbyl hydroxy compound necessarily formed in the reaction in accord with the foregoing stoichiometry by azeotropic distillation. Thus, for instance, in the case of aromatic hydrocarbon reaction media such as benzene or toluene, these serve as relatively efficient and very easily operable means of removing the hydrocarbyl hydroxy compound, e.g., the alcohols, formed as a result of the reaction by distillation of the well-known azeotropes formed by such aromatic hydrocarbons and such hydrocarbyl hydroxy compounds.

If a solvent or reaction medium is used, it must be non-reactive to not only the reaction intermediates but also to the products of the reaction, i.e., the tetrakis(dihydrocarbylamino)ethylenes. Suitable specific types of such solvents or reaction media include the aromatic, alicyclic, and aliphatic hydrocarbons. Other solvents include the hydrocarbon ethers and esters.

After removal of the hydrocarbyl hydroxy compound formed in accord with the foregoing stoichiometry by reaction of the dihalomethyl hydrocarbyloxy ether with the secondary amine, most conveniently by azeotropic distillation as just discussed, the reaction mixture is normally filtered to remove precipitated solids. Alternatively, the reaction sequence can be modified in some instances by removal of the amine hydrohalide formed in accord with the foregoing detailed stoichiometry in the first step of the reaction sequence at that point prior to addition of the metal hydrocarbyl oxide.

In any event, the over-all process is completed by heating the reaction mixture to drive off the hydrocarbyl hydroxy compound from the intermediate bis(dihydrocarbylamino) hydrocarbyloxymethane and thereby form the desired tetrakis(dihydrocarbylamino)ethylene. This can be done by, in the case of the use of the inert reaction media, heating the reaction mixture at the temperature of reflux of such media and removing the hydrocarbyl hydroxy compound involved again by azeotropic distillation or, alternatively, if no reaction medium is involved, by simply heating the reaction mixture in bulk at temperatures up to 225° C.

The tetrakis(dihydrocarbylamino)ethylene product can be isolated by distillation or crystallization depending on the physical properties of the product, varying as is usually expected with the nature of the size and complexity of the portions of the molecule carried on the amino nitrogens. The isolation and purification, as well as the over-all preparative process, should be carried out in an inert atmosphere, e.g., nitrogen, helium, argon, etc., also in the absence of moisture to minimize destruction of the reactive dihalomethyl hydrocarbyloxy ether starting material and also the tetrakis(dihydrocarbylamino)ethylene final product.

The following examples are submitted to illustrate but not to limit the process of this invention.

*Example I*

To a solution of 23 parts of α,α-dichloromethyl methyl ether in 132 parts of benzene was added dropwise 38 parts of N,N'-dimethylethylenediamine. During the addition the reaction mixture was stirred and cooled to maintain the temperature at 40–60° C. The reaction mixture then was heated at the reflux, removing the benzene/methanol azeotrope, boiling at 58° C. at atmospheric pressure, until distillation of the azeotrope ceased. There was collected 18 ml. (94% of theory) of the azeotrope over about six hours. To the resulting cooled reaction mixture was added portionwise with stirring 21.6 parts of sodium methoxide followed by removal of the methanol formed by distillation of its azeotrope with benzene. The reaction mixture was cooled, filtered and the filtrate distilled to give 13.1 parts (66% of theory) of 1,1',3,3'-tetramethyl-$\Delta^{2,2'}$-bi(imidazolidine) boiling at 97° C. under a pressure corresponding to 8 mm. of mecury and melting at 57° C.

*Example II*

With stirring, 100 parts of N,N'-diethylethylenediamine was added dropwise to a solution of 46 parts of α,α-dichloromethyl methyl ether in 264 parts of benzene. The vigorous reaction was moderated by cooling to maintain the temperature at 40 to 60° C. during the addition. When addition of the amine was complete, the mixture was heated at the reflux, and the methanol/benzene azeotrope was removed by distillation until no more could be obtained. The mixture of solid and liquid was cooled to room temperature, and 43.2 parts of sodium methoxide was added portionwise through a solids addition funnel. Again the methanol/benzene azeotrope was removed by distillation until no further amounts of the azeotrope could be obtained. Distillation of the reaction mixture after filtration gave 19.8 parts (39% of theory) of 1,1',3,3'-tetraethyl-$\Delta^{2,2'}$-bi(imidazolidine) boiling at 122 to 123° C. under a pressure corresponding to 8 mm. of mercury and melting at 48° C.

*Example III*

Example I was substantially duplicated using 23 parts of α,α-dichloromethyl methyl ether, 132 parts of benzene, 30.6 parts of pyrrolidine and 21.6 parts of sodium methoxide. On completion of the reaction, all volatile material up to a boiling point of 105° C. under a pressure corresponding to 0.6 mm. of mercury was removed from the reaction mixture. The residue, which solidified on cooling, was crystallized from ethyl acetate. It then melted at 91 to 93° C. and was shown to be tetrakis(N-pyrrolidinyl)ethylene by its melting point and by comparison of its infrared spectrum with that of a known sample of the peraminoethylene. The compound, which was obtained in 10% of the theoretical yield, showed the characteristic chemi-luminescence of this peraminoethylene on exposure to air.

*Example IV*

To a solution of 107 parts of dimethylamine in 176 parts of benzene was added over one and one-half hours 57.5 parts of α,α-dichloromethyl methyl ether while maintaining the temperature at 20 to 30° C. After stirring for one hour at room temperature, the mixture was subjected to distillation, first removing the excess dimethylamine, then the methanol/benzene azeotrope. The mixture was cooled and 54 parts of sodium methoxide were added portionwise. The mixture was again distilled removing dimethylamine and methanol/benzene azeotrope formed by the sodium methoxide treatment. The reaction mixture was filtered and subjected to distillation to give 10.8 parts (18% of theory) of dimethylformamide dimethylacetal, B.P. 99° C., $n_D^{25}$ 1.3941, identified by comparison of its infrared spectrum with that of a known sample.

Continued distillation after the isolation of the dimethylacetal gave 9 parts (14% of theory) of bis(dimethylamino)methoxymethane, boiling at 53 to 55° C. under a pressure corresponding to 52 mm. of mercury. On redistillation at atmospheric pressure, the diaminomethoxymethane boiled at 124 to 126° C. The distillation residue remaining after isolation of the diaminomethoxymethane contained tetrakis(dimethylamino)ethylene identified by its characteristic fluorescence under 3660 A. activation and by its chemiluminescence on exposure to air.

In addition to the previously enumerated secondary amines, there can also be used such other secondary amines as ethyleneimine, i.e., aziridine, azetidine, i.e., azacyclobutane, perhydroazepine, $\Delta^3$-pyrroline, i.e., 2,5-dihydroazoline, N,N'-di-n-dodecylethylenediamine, and the like. Using these additional secondary amines in the process as previously described, there will be obtained the following illustrative tetrakis(cyclic and acyclic disubstituted-amino)ethylenes: 1,1,2,2-tetrakis(1-aziridinyl) ethylene, 1,1,2,2-tetrakis(1-azetidinyl)ethylene, 1,1,2,2-tetrakis(1-hexahydroazepinyl)ethylene, 1,1,2,2-tetrakis(1-2,5-dihydroazolinyl)ethylene, i.e., 1,1,2,2-tetrakis(1-$\Delta^3$-pyrrolinyl) ethylene, 1,1',3,3₂-tetra-n-dodecyl-$\Delta^{2,2'}$-bi(imidazolidine) and the like.

The tetrakis(disubstituted-amino)ethylenes are especially useful as high energy fuels since they exhibit not only high specific impulses but also high heats of combustion. Thus, the heat of combustion of 1,3'-diethyl-1',3-dimethyl-$\Delta^{2,2'}$-bi(imidazolidine) is 8770 cal./g. and that of 1,1',3,3'-tetraethyl-$\Delta^{2,2'}$-bi(imidazolidine) is 8970–9010 cal./g. The 1,1',3,3'-tetramethyl-$\Delta^{2,2'}$-bi(imidazolidine) is so active that it spontaneously fires when pressured to about 40 p.s.i. with oxygen. Accordingly, a specific value for the heat of combustion thereof has not been obtained, but it is obviously high.

The tetrakis(disubstituted-amino)ethylenes are also generically useful as moderate to strong organic reducing agents. Thus, they can successfully carry out such reductions as $S_2O_8^= \rightarrow 2SO_4^=$; $MnO_4^- \rightarrow MnO_2$; $PbO_2 \rightarrow Pb^{+2}$; $Cr_2O^= \rightarrow 2Cr^{+3}$; $Br_2 \rightarrow 2(Br^-)$; $IO_3^- \rightarrow I^-$; $Hg^{+2} \rightarrow Hg^0$; $Ag^+ \rightarrow Ag^0$; $Fe^{+3} \rightarrow Fe^{+2}$; $AsO_4^{-3} \rightarrow AsO_2^-$;

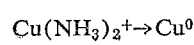
$Cu(NH_3)_2^+ \rightarrow Cu^0$ and the like.

Still another use for the tetrakis(disubstituted-amino) ethylenes is as oxygen scavengers. They can serve thereby, as gasoline stabilizers, especially for the more conventional leaded gasolines, to prevent deterioration of the fuels on standing. They also form basis for a suitable analytical procedure for determining the amount of oxygen in a system by simply putting a known quantity of the aminoethylene in the system in question and determining the amount of carbonyl formed when reaction was complete.

As many apparently widely different embodiments of this invention may be made without departing from the spirit and scope thereof, it is to be understood that this invention is not limited to the specific embodiments thereof except as defined in the appended claims.

I claim:
1. The process of preparing a tetrakis(dihydrocarbylamino)ethylene which comprises sequentially
    (1) reacting together (a) a hydrocarbyl dihalosubstituted methyl ether of the formula

X'X"CHOR wherein R is a monovalent hydrocarbyl group of up to 12 carbon atoms and free of aliphatic unsaturation, and X' and X", which can be the same or different, are halogens of atomic number from 9–53, inclusive, and (b) a secondary amine of the group consisting of $R^1R^2NH$, $R^3NH(CH_2)_nNHR^4$ and QNH wherein $R^1$, $R^2$, $R^3$, and $R^4$, which can be the same or different, are monovalent hydrocarbyl radicals of up to 12 carbons, and free of aliphatic unsaturation, n is an integer between 2 and 4, inclusive, and Q is a divalent aliphatically saturated hydrocarbyl radical of up to 12 carbons forming with the depicted nitrogen a ring of 3–7 atoms;
    (2) reacting the reaction mixture from (1) with an aliphatic saturated hydrocarbyl oxide of up to 12 carbons of alkali and alkaline earth metals of atomic number 3–56, inclusive; and
    (3) raising the temperature of the reaction mixture from (2) and recovering the tetrakis(dihydrocarbylamino)ethylene therefrom.

2. The process of claim 1 wherein the amount of secondary amine present at the start of step (1) is at least sufficient to displace the halogens of the hydrocarbyl dihalosubstituted methyl ether and to neutralize the halogen halide formed concurrently.

3. The process of claim 1 wherein the hydrocarbyl dihalosubstituted methyl ether is methyl α,α-dichloromethyl ether.

4. The process of claim 1 wherein the secondary amine is N,N'-dimethylethylenediamine.

5. The process of claim 1 wherein the metal hydrocarbyl oxide is sodium methoxide.

6. The process of claim 1 wherein the hydrocarbyl dihalosubstituted methyl ether employed in (1) is dissolved in benzene and removing the methyl alcohol azeotrope from the reaction mixture from step (1) by distillation prior to step (2).

References Cited

UNITED STATES PATENTS 3,239,519  3/1966  Winberg _____ 260—309.7
3,239,534  3/1966  Winberg _____ 260—309.7

JOHN D. RANDOLPH, *Primary Examiner.*

N. TROUSOF, *Assistant Examiner.*